United States Patent [19]

McMahon

[11] 3,882,462

[45] May 6, 1975

[54] FINGERPRINT RECOGNITION APPARATUS USING NON-COHERENT OPTICAL PROCESSING

[75] Inventor: Donald H. McMahon, Carlisle, Mass.

[73] Assignee: Sperry Rand Corporation, New York, N.Y.

[22] Filed: Jan. 30, 1974

[21] Appl. No.: 438,130

[52] U.S. Cl. .......... 340/146.3 E; 356/71

[51] Int. Cl. .......... G06k 9/13

[58] Field of Search...340/146.3 F, 146.3 E, 146.3 Q, 340/146.3 P; 350/6, 7, 162 SF, 190; 356/71

[56] References Cited

UNITED STATES PATENTS

| | | | |
|---|---|---|---|
| 3,492,469 | 1/1970 | Silverman | 340/146.3 Q |
| 3,641,255 | 2/1972 | Macovski | 350/162 SF |
| 3,740,153 | 6/1973 | Wood | 356/71 |
| 3,771,129 | 11/1973 | McMahon | 340/146.3 E |

*Primary Examiner*—Gareth D. Shaw
*Assistant Examiner*—Leo H. Boudreau
*Attorney, Agent, or Firm*—Howard P. Terry; S. C. Yeaton

[57] ABSTRACT

Apparatus for fingerprint recognition is disclosed utilizing relatively simple and inexpensive non-coherent optical processing techniques wherein the fingerprint ridge line orientations in a plurality of finite sampling areas of the fingerprint image are inspected with the aid of a rotating onedirectional light-smearing element inserted in the reimaging light path. The apparatus employs light that is transmitted or scattered by the rotating element and uses the consequent time variation of the light level at an image plane to determine ridge orientation. At the image plane of the processor, there is located a plurality of photodetectors, each individual detector of the array corresponding to a particular sampling area of the fingerprint. The time delay between a reference orientation of the light smearing element and the occurrence of a light peak at each detector may be noted and a proportional analog or digital representation may be generated for immediate or subsequent comparison with corresponding signals representative of the fingerprints being presented for identification.

22 Claims, 17 Drawing Figures

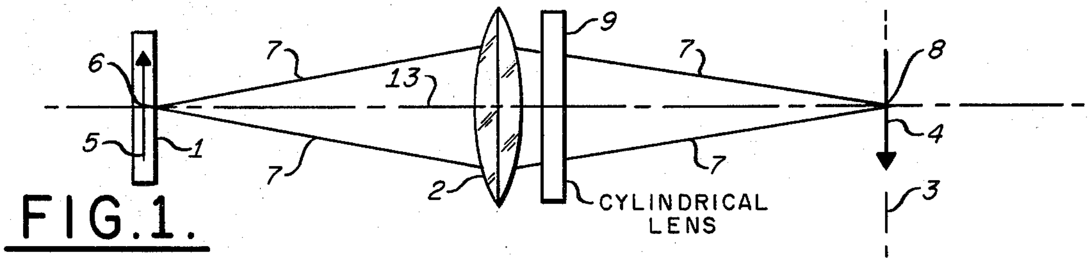
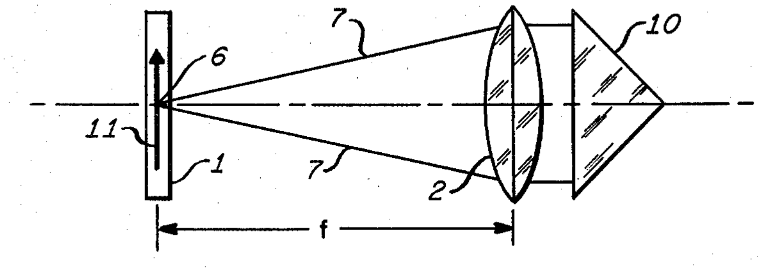
FIG. 2.
FIG. 3.
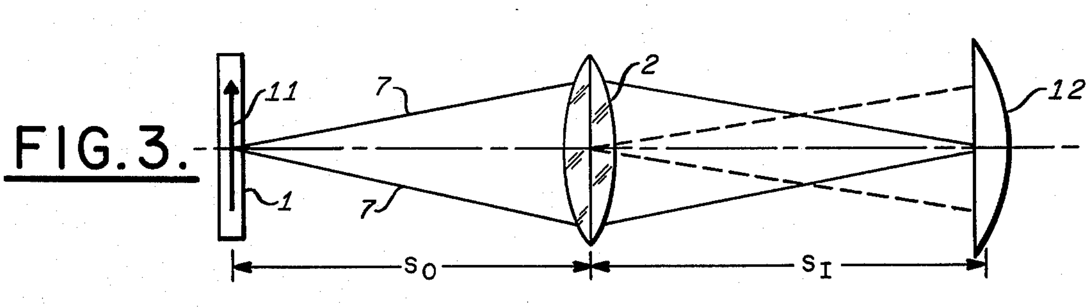
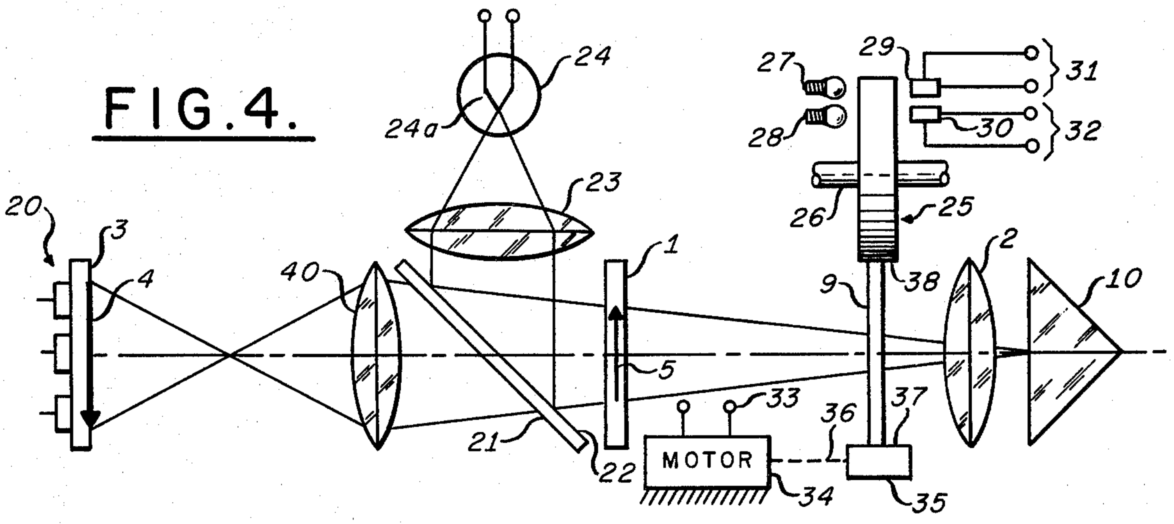
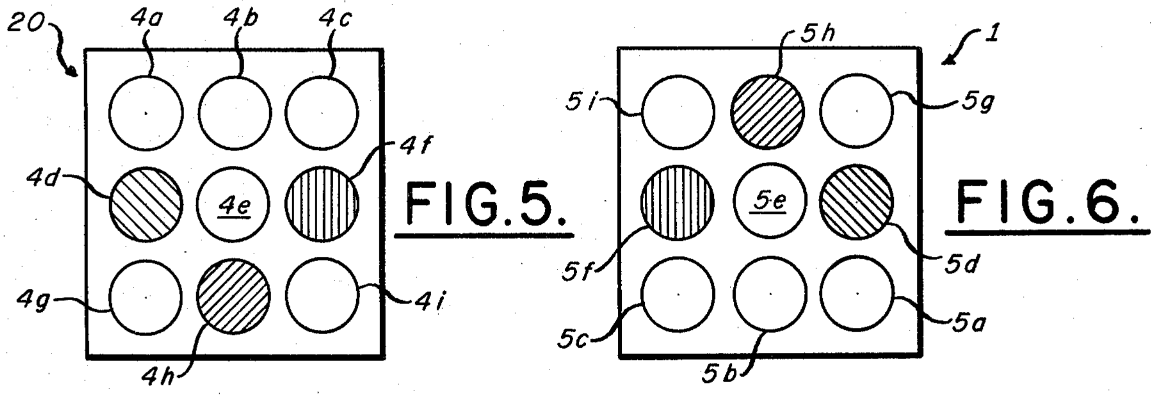
FIG. 5. FIG. 6.

FINGERPRINT RECOGNITION APPARATUS USING NON-COHERENT OPTICAL PROCESSING

BACKGROUND OF THE INVENTION

1. Field of the Invention

The invention relates generally to optical processors and more particularly to a method and apparatus for fingerprint identification utilizing non-coherent optical processing techniques.

2. Description of the Prior Art

It is known that automatic high speed fingerprint identification can be obtained by the use of optical signal processing techniques; accordingly, a variety of devices and methods is known in the prior art having the objective of satisfying this requirement. In some of the processors, an image of the fingerprint to be identified in compared optically with a prerecorded image of the fingerprint. In other types of coherent optical processors, comparison is made between input and prerecorded Fourier transform signals representative of the fingerprint data. These image and Fourier transform signal comparators have been implemented using either conventional or holographic techniques and essentially constitute matched filter or autocorrelator devices which provide an indication either of full comparison or of noncomparison between a modulated optical beam representative of the fingerprint and a prerecording of the print. Other somewhat more sophisticated devices provide inspection or comparison or certain details of the input fingerprint with prerecorded fingerprint data; for instance, the location of ridge line endings or the slope of the ridge lines in one region has been determined relative to the slope of the ridge lines in another region of the fingerprint. Such systems, however, tend to become elaborate, often inherently requiring complex implementation.

As to the matched filter or correlator types of identification systems, it is apparent, where it is desired to discriminate between large numbers of individuals, that a suitable recognition system would preferably provide a plurality of identifying data bits as opposed to a single data bit as in the form of an analog signal. Evidently, such a single data bit device simply indicates recognition or lack of recognition and has other inherent limitations. However, higher accuracy can be achieved by abstracting many bits of information and using this collective data with softward processing to arrive at a binary recognition decision; such a capability is desirable or even essential in applications using rapid data transmission or digital computer processing and requiring compatibility with conventional drum, disk, tape, or other storage apparatus. Further, reliance on a single composite signal, as provided by a matched filter device, adversely affects accuracy and discrimination capability because such devices are sensitive, for example, to orientation and distortion of the fingerprint.

In general, prior art pattern recognition systems of the type suitable for fingerprint recognition may be characterized as having one or more of the following deficiencies: complexity of manufacture, sensitivity to fingerprint distortion and orientation, lack of sufficient reliability, and high cost. For specific example, holographic and those other types of fingerprint recognition systems requiring coherent optical radiation require expensive and complex coherent light sources.

SUMMARY OF THE INVENTION

The invention provides a means for the rapid sampling of the orientation of the ridges making up a fingerprint pattern by using a simple non-coherent light source and by the observation of variations in transmitted or scattered light. The print image in the form of an opaque photograph transparency or grease impression on a transparent substrate is used in an optical processing system reimaging the print image upon itself within a reflecting optical system of unity magnification. The ridge angle is measured by rotating an optical component such as a cylindrical lens in the reimaging path, which component produces a one-directional smearing of the reimaged light. The light transmitted by each discrete sampled area of the fingerprint image varies in accordance with the instantaneous relation of ridge direction and the light smearing direction. Therefore, an array of optical detectors may be used to detect the variations in light signal level in terms of the light smearing direction.

Accordingly, the fingerprint recognition apparatus uses relatively simple non-coherent optical processing techniques wherein the ridge line orientations of a fingerprint or similar pattern in a plurality of sampling areas are examined with the aid of a rotating one-directional light smearing or scattering element which may take the form of a cylindrical lens. Light either transmitted or scattered by the rotating element demonstrates a variation in light level at an image plane occupied by a matrix of photodetectors to afford individual measures of the ridge orientations. The time delay between a reference orientation of the light smearing element and the occurrence of a light peak or null (extremum value) at each individual detector of the matrix is measured and a corresponding analog or digital representation is generated. The latter may be stored for display or for transfer to a suitable digital processor. It is an object of the present invention to provide an improved fingerprint inspection apparatus which is comparatively simple and inexpensive to manufacture, less sensitive to optical and manufacturing tolerances, less sensitive to fingerprint orientation and distortion, capable of high reliability, and adaptable to use with digital computer processing apparatus.

BRIEF DESCRIPTION OF THE DRAWINGS

FIGS. 1, 2, and 3 are optical schematic illustrations of simplified apparatus embodying the principles of the invention.

FIG. 4 is an optical schematic illustration showing one embodiment of the invention.

FIGS. 5 and 6 are face views of elements of the apparatus of FIG. 4.

DESCRIPTION OF THE PREFERRED EMBODIMENTS

Figure 7:
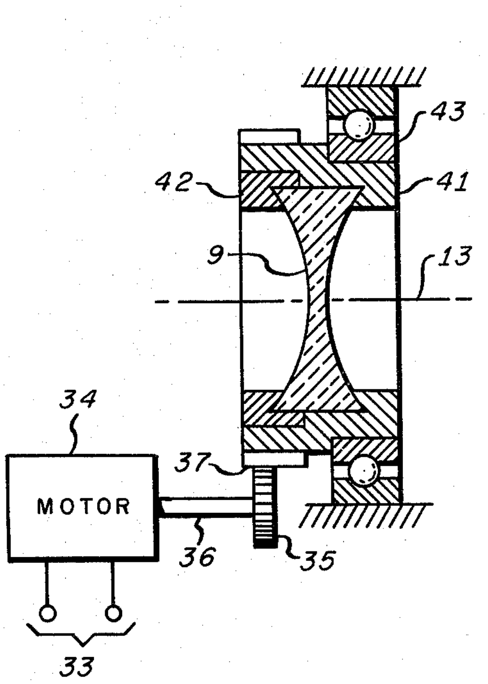
FIG. 7 is a partial cross section view of an element of the apparatus of FIG. 4.

Before proceeding with a description of the method and apparatus embodying the principles of the invention, it is worthwhile first to consider briefly the nature of a typical fingerprint. In general, a fingerprint is characterized by a pattern of ridge lines having relatively constant spacing and orientation over any finite small area. The present invention is based on means for inspection of the ridge line orientation in a plurality of such small sampled areas distributed generally uniformly over the area of the fingerprint. It will be appreciated that, in a given fingerprint, the various ridge line orientations at the plurality of sampled positions are uniquely different from the ridge line orientations at a plurality of similar positions for any other fingerprint, provided that a sufficient number of sampled areas is used.

The invention utilizes phenomena illustrated in the simple drawing of FIG. 1, wherein it is recognized that non-coherent light passing through a transparent substrate 1 supporting as an object a fingerprint or similar pattern represented by arrow 5 will form an inverted two dimensional image of the pattern in the image plane 3 because of the presence of the positive lens 2, that inverted image being represented by arrow 4. Any point such as point 6 on the object or arrow 5 will, as indicated by the light rays 7, produce a corresponding light image point, such as point 8 on image 4. Other points on object 5 form other corresponding points of the inverted image 4, as is well known to those skilled in the art, and as is also depicted in other figures of this specification.

By way of general example, assume that a diffusing element 9 is inserted on axis 13 in the optical path, the diffusing element 9 having the special property of smearing or blurring the light forming the image 4 in one direction only, having substantially no such effect in the orthogonal direction. As will be seen, an example of such a device is a conventional positive or negative stigmatic lens such as a cylindrical lens which in effect diffuses certain parts of the image by defocussing those parts, while other parts of the image remain clearly focused. While it is preferred to use a cylindrical lens as element 9, a conventional phase grating may alternatively be employed. If the diffusing element or cylindrical lens 9 is continuously rotated with its effective rotational axis coincident with the system axis 13, any given position of the fingerprint or other image will be alternately smeared and clear in a cyclic manner at twice the frequency of rotation of the stigmatic diffusing element 9. Where the image 5 is a fingerprint or some other image made up of areas of individual arrays of substantially parallel lines or ridges, a clear line or ridge pattern is seen, for example, in the image plane 3 at any one instant of time only for those areas where the ridge line direction lies in the direction of smearing.

While an arrangement based on the principle illustrated by FIG. 1 is of material interest, certain problems in fully instrumenting it require further consideration. For example, the single direction smearing characteristic of cylindrical lens 9 is in itself a linear process which cannot alter the average amount of light striking any significant area of the image pattern 4. In this context, a significant area of a fingerprint to be analyzed is an area encompassing at least several lines or ridges. What is needed to make effective use of the image smearing effect is a means for detecting the difference between smeared and unsmeared ridge patterns, such as the non-linear optical processing arrangement supplied by the present invention. The novel non-linear processor as employed in the invention desirably produces an output signal which is not linearly proportional to the illuminating light power level.

Two unique observations furnish keys to conception of the novel non-linear optical processor for use in fingerprint recognition or the like. The first is the fundamental observation that light absorption and light scattering are both non-linear processes and that they may be used to distinguish a blurred or smeared line or ridge pattern from an unsmeared line or ridge pattern. Secondly, according to the present invention, it is observed that the fingerprint pattern itself supplies a useful non-linear absorption or scattering pattern for distinguishing between the smeared and unsmeared image light originated at the fingerprint pattern.

According to the invention, it is recognized that a non-coherent light image plane processor for reading fingerprint ridge or line orientation can be generated by re-imaging the one-directionally smeared image back on top of the original fingerprint or line pattern. Re-imaged light transmitted through or scattered from the object pattern as a function of spatial location on the object pattern constitutes a detectable light signal. In particular, it assumes an extremum value when the direction of smearing of the lines is parallel to the ridge or line orientation.

The extremum magnitude signal may be either a maximum or a minimum signal at the aforementioned alignment condition. If the cylindrical lens 9 or other stigmatic smearing element is rotated at a uniform speed and its angular rotational position is continuously measured, the rotational position of the smearing element 9 at the time instant of the extremum light signal is a true measure of the ridge or line orientation for that area of the fingerprint pattern from which the light signal was originally collected. The proper processing or spatial filtering action requires that the re-imaged light form a relatively high quality image of the fingerprint pattern of precisely unity magnification and that it forms the image, in the absence of the smearing element 9, in precise and exact registration on top of the original fingerprint pattern.

FIG. 2 and 3 represent embodiments each of which provide the desired formation of an erect, unity-magnified image superimposed in exact registration on the object fingerprint pattern. In FIG. 2, a transparency or opaque card 1 supports a line or ridge image and lies at the focal point 6 of a positive lens 2 backed by a closely spaced corner reflector prism 10. The light from the pattern under study is reflected by reflector 10 and is refocussed by lens 2 to form an image in the object plane on card or transparency 1. The arrow 11 represents both the object and image patterns and they lie precisely in perfect registration one on the other.

In FIG. 3, a transparency or opaque card 1 supports a line or ridge image and lies a distance $s_0$ from a positive lens 2. At a distance $s_I$ from lens 2 there is placed at the image plane a concave reflector 12. The focal length $f$ of lens 2 is given by the familiar relation:

$$1/f = 1/s_0 + 1/s_I$$

Preferably, a spherically concave mirror 12 with a focal length of $s_I/2$ is used, although a flat mirror may be substituted if a lens of focal length $s_I$ is used, closely spaced to the flat mirror. The additional lens is used as a condensing lens to maximize the fraction of the original image light which is re-transmitted through fingerprint imaging lens 2. The light from the pattern under study is reflected by mirror 12 and is refocussed by lens 2 to form an image in the object plane on the card or transparency 1. Again, arrow 11 represents both the object and image patterns as they lie precisely in perfect registration one upon the other.

FIGS. 4 through 9 represent an embodiment of a fingerprint recognition system according to the present invention, along with its several components. It includes elements similar to those of FIGS. 1 and 2 which are supplied with corresponding reference numerals, including transparency 1, positive reimaging lens 2, an image plane 3 which is now occupied by the front surface of a multi-element light detector array 20, a processed image 4, an object image 5, and an image smearing element in the form of a rotatable cylindrical lens 9.

For illumination, a non-coherent light source 24 is employed which has a roughly point light source filament 24*a*; the light from filament 24*a* is condensed by the positive lens 23 and illuminates the partially transparent surface 22 of the 45° mirror 21. Light reflected from surface 22 passes through transparency 1, illuminating the fingerprint image 5 to be inspected. Light from the print image 5 passes through rotatable cylindrical lens 9 and positive lens 2 to be reflected by a mirror or corner retroreflective prism 10 as in FIGS. 2 or 3. The reflected light beam again traverses lens 2 and 9 and transparency 1. A portion of the light energy flows through mirror 21 and is caused by imaging lens 40 to generate the inverted image 4 in the image plane 3 also occupied by detector array 20. As will be described, the embodiment is supplied with an angular position pick off generally indicated at 25 for developing angular position signals representing the rotational position of cylindrical lens 9.

In operation, light from the non-coherent light source 24*a* passes through the condensing lens 23, is partially reflected off the surface 22 of mirror 21, passes through a transparency 1 having a fingerprint pattern 5, and is focussed as a spot of minimal area at the retroreflecting prism 10. Prism 10, in cooperation with reimaging lens 2, forms an erect unity-magnified image at 5 of the original fingerprint pattern, superimposed in exact registration with the original fingerprint pattern on transparency 1.

Now, neglecting the influence of the one-directional smearing lens 9, non-coherent light from source 24*a* transmitted through the transparent parts of the fingerprint pattern 5 on the first pass of the light therethrough, is reimaged so as to fall precisely on the transparent portions of the pattern 5 during the reverse passage of the light through transparency 1, and is then transmitted toward the detector array 20. Light energy which passes twice through transparency 1 in the sampled areas of the fingerprint pattern constitutes the desired signal pattern, containing the useful data that is to be detected. Therefore, the imaging lens 40 is used to form an inverted image 4 of the spatially filtered pattern on image plane 3 for examination by detector array 20. As will be seen, the purpose of detector array 20 is to sample cyclically the energy in each sampled area of the fingerprint as a function of time.

In the embodiment of FIG. 4, the one-directional imagesmearing element again is preferably a rotatable cylindrical lens 9, either positive or negative, which defocusses image lines except for those image lines instantaneous falling parallel to the active focussing plane of the cylindrical lens. That is, the instantaneous defocussing action lies in the direction of the object ridge lines; the defocussed light, by being superimposed upon the object lines themselves, even though diffused, does not lead to an apparent diffused pattern. For a given cylindrical lens orientation, all light transmitted by areas whose ridges are so aligned, will on the second passage through the optical system, pass through the transparency 1 if they passed through it on the first passage through the optical system; a maximum light signal will result at a corresponding detector in array 20 at a corresponding instant of time. Conversely, for all other ridge alignments, some of the light passing for the first time through a pattern on transparency 1 is diffused in a direction perpendicular to the particular ridge direction and is instantaneously re-imaged on partly or fully opaque portions of the pattern lying on transparency 1.

FIG. 6 represents, in a general way, a transparency 1 including arbitrary patterns of parallel lines which may represent fingerprint ridges. For example, the areas designated 5*a* to 5*i* represent sample areas in which the ridge line detail of a fingerprint is to be inspected. For purposes of description, it is assumed that the ridge line orientation is vertical in area 5*f* and slanted to the right and left, respectively, in areas 5*h* and 5*d*. It should be understood at this point that the representative sample areas 5*a* to 5*i* are not physically formed by any structure located in or adjacent the transparency plane, but rather are defined by the location and physical shape of the detectors 4*a* to 4*i* of FIG. 5 lying in the image plane 3; here, detectors 4*a* to 4*i* correspond respectively to sample areas 5*a* to 5*i* in accordance with the inverting qualities of lens 40. It will be seen that presence of the pattern 5*d* will cyclically generate a pulsating current in the corresponding detector 4*d*, that the pattern 5*f* will generate a cyclic pulsating current in detector 4*f* at a somewhat later orientation in the cycle of rotation of lens 9, and that the pattern 5*h* will generate an additional cyclic pulsating current in detector 4*h* at a still later time in the same cycle. Accordingly, depending upon the nature of the fingerprint or other line pattern being recognized, there will appear phased apart cyclic electrical outputs at the several light detectors 4*a* through 4*i*, as illustrated for one such representative detector in FIG. 10. It will be appreciated that, in most instances, a greater number of light detectors will be used in the array 20, depending upon the number of areas it is desired to sample. Use of the pulsating outputs of the array 20 of detectors is made by the signal processing system yet to be described in connection with FIG. 9.

As previously noted, operation of the embodiment of FIG. 4 depends upon rotation of cylindrical lens 9 spaced from the imaging lens 2. Lens 9 may be conveniently rotated by a motor 34 supplied with electrical power at terminals 33, motor 34 driving a shaft 36 and a drum 35 as illustrated in more detail in FIG. 7. The surface 37 of drum 35 may be supplied with gear teeth meshing with corresponding gear teeth on an annular lens mounting ring 41 in which the lens 9 is supported, being held in mounting ring 41 by the retaining ring 42. Ring 41 is, in turn, mounted in a conventional bearing 43 for rotation about the optical axis 13. A simple friction or other drive may be used between drum 35 and the mounting ring 41.

Figure 8:
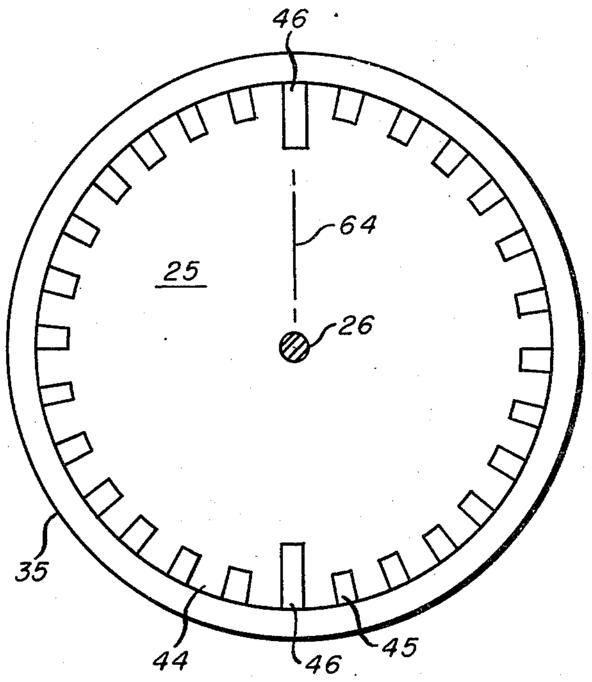
FIG. 8 is a view of a further element of the apparatus of FIG. 4.

Referring again to FIGS. 4 and 8, the embodiment is equipped with an optical pick off system utilizing the disk 25 mounted on rotatable shaft 26. Light source 27 cooperates with the disk 25 to supply certain reference output signals at terminals 31 of the photocell 29. Similarly, light source 28 cyclically activates photocell 30 to supply output pulses at terminals 32. These reference signals are utilized in the processing arrangements yet to be discussed in regard to FIG. 9. In FIG. 8, the periphery of pick off disk 25 contains alternating opaque and transparent sections 44 and 45, respectively, which function in combination with the light source 27 and photodetector 29 for generating reference timing pulses which are applied to the counter 65 of the processing system of FIG. 9. Radially lengthened transparent sections 46 on diametrically opposite sides of the disk 25 function in conjunction with an additional light source 28 and light detector 30 for providing the counter reset pulses to the apparatus of FIG. 9 for indicating crossings of the vertical axis 64 or other arbitrarily selected reference plane. The optical pick off disk 25 of the embodiment will be driven in synchronism with the rotation of the cylindrical lens 9 so that there is always one-to-one correspondence in the angular positions of lens 9 and pick off disk 25.

Figure 10:
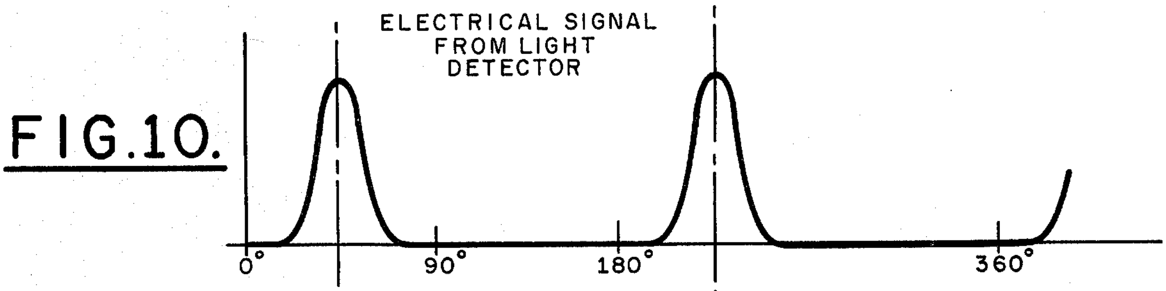
FIGS. 10 and 11 depict signal wave forms useful in explaining the operation of the invention.
Figure 11:
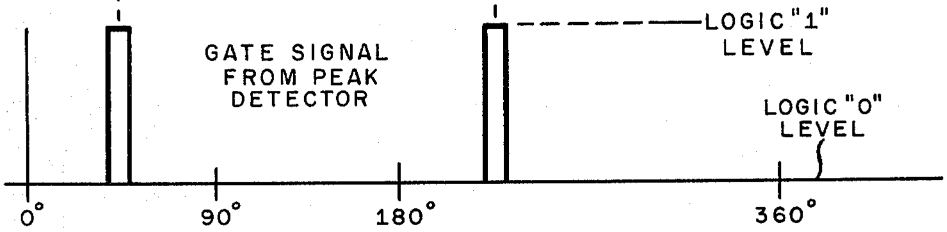

As the cylindrical lens 9 is rotated, each detector in array 20 may receive light corresponding to a predetermined sized area of the transparency. Thus for the case of the assumed ridge line orientations of areas 5*d*, 5*f*, and 5*h*, the inverted image appears as shown in FIG. 5 at the location of detectors 4*d*, 4*f*, and 4*h*. It will be appreciated that a greater or lesser number of detectors can be used depending on the number of sample areas desired to be used. As lens 9 is rotated, the impulses corresponding to each of the detectors of array 20 are respectively coupled from detectors 4*a* to 4*i* to corresponding amplifier peak or extremum detectors 23*a* through 23*i* and the inpulse peaks, for example, of FIG. 10 are converted in a conventional manner to relatively short pulses, generating the appropriately phased pulses of FIG. 11. It will be seen that the pulses of FIG. 11 may equally well be formed by the presence of minimal values of the wave form of FIG. 10, if desired. Upon crossing the vertical reference axis 64 of FIG. 8, counter 65 is reset to zero and a sequence of synchronized timing pulses, representing the lens 9 orientation, is generated and is sent to the counter 65. The stages of the counter, in turn, are coupled to the respective stages of an array of different storage registers 22*a* to 22*i*, each associated with one of the light detectors of the image plane detector array 20. The number of pulses in the counter at any one instant is representative of the angular position of the cylindrical lens 9 relative to the vertical axis 64. Thus, in the case for instance of one clock pulse per degree of rotation, counter 65 will have a count of 45 upon reaching the position 45° clockwise from the vertical axis 64, at which time a peak in the electrical signal at the output of detector 5*a* occurs. This signal may be applied to a peak detector 23*a*, which may be of conventional design, to produce a signal as shown in FIG. 11 at the output of the peak detector 23*a* for application to the clock input terminals of a multi-bit storage register 22*a*. Each multi-bit storage register consists of a sufficient number of latch circuits so as to represent the orientation of the cylindrical lens element with the desired accuracy. These latch circuits operate to accept input data only when a gating clock input signal is applied to the clock input terminal of each storage of the register. Thus, a digital signal representative of the count of 45 will be stored in shift register 22*a* representing the angular orientation of the ridge lines in sample area 5*a*. Likewise, upon rotating 90°, cylindrical lens 9 will transmit light corresponding to the ridge lines at sample area 5*f* and at that instant another photodetector will produce an electrical output signal which is applied through a related peak detector to provide a clock pulse to the associated storage register so that a digital signal corresponding to the instantaneous count of 90 is stored in that register. The same action occurs at each successive angle for which there is a detector in the image plane 3. As a consequence of the line symmetry in the cylindrical lens 9 and the parallel digital processing, it will be recognized that the digital representation of all sample areas can be generated in one-half revolution of the lens 9. In the case of serial digital processing, on the other hand, where a single storage register is time shared, it would be possible to generate the digital signal for only one sample area in each half revolution of the scanning spatial filter 9 and thus a number of revolutions equal to at least half the number of sample areas ould be necessary to inspect all of the sample areas.

From the foregoing description, it will be apparent to those skilled in the art that a unique digital signal is stored in each storage register 22*a* to 22*i* corresponding to the fingerprint ridge line orientation at each successively examined sample position. If the same transparency is similarly positioned in the optical system at some later time, the same sample areas will produce essentially identical digital signals which, when compared with the previously recorded signals, will be noted to be substantially the same and thus perform recognition. The likelihood of correlation of any other fingerprint transparency, however, with the digital signals corresponding to a particular print is remote. Although another fingerprint may have identically or somewhat similarly oriented ridge lines in some of the sample areas, the orientation will not be the same for all sample areas.

Figures 12, 13:
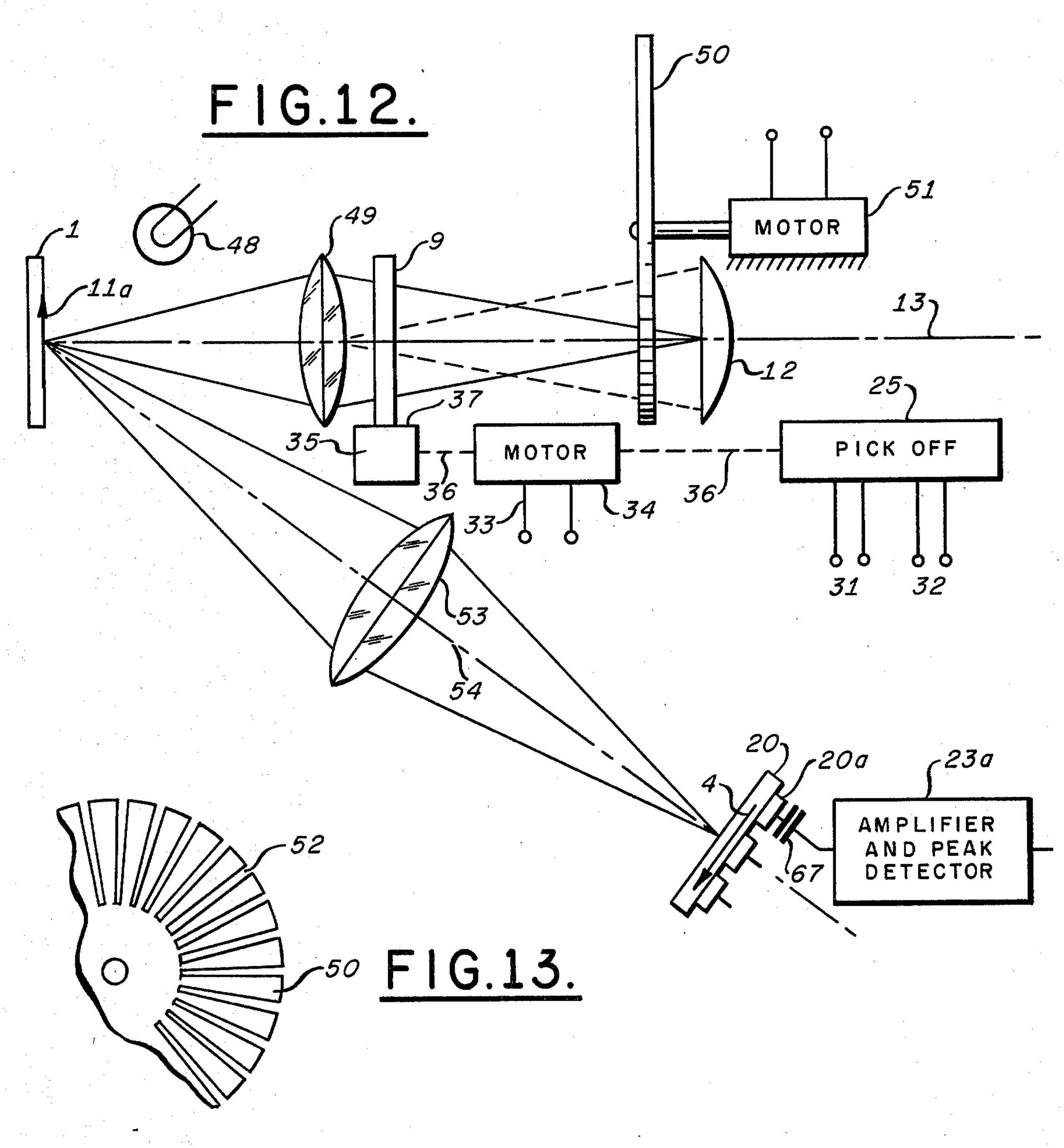
FIG. 12 is a schematic of a further embodiment of apparatus constructed in accordance with the principles of the invention.
FIG. 13 is a face view of an element of the apparatus of FIG. 12.

The embodiment of FIG. 4 may be altered, still using the same general principles of operation, as illustrated in FIG. 12 where previously employed reference numerals are again used for elements analogous to those found in the preceeding figures. In the system of FIG. 12, an opaque card 1 bearing the image to be investigated in illuminated by a source of non-coherent light 48. The fingerprint image to be examined is represented by the arrow 11*a* on the surface of card 1. A portion of the light illuminating card 1 and its image 11*a* is collected by the reimaging lens 49 and forms an inverted image 4, substantially coincident with spherical mirror or other reflector 12. Also placed on the optical axis 13 of the system is a rotatable cylindrical lens 9 generally arranged and driven as described in connection with FIG. 4 by a motor 34 to which is also coupled by mechanical link 36 a pick off system 25 which may be generally similar to that illustrated in FIGS. 4 and 7 for operation with the processor of FIG. 9.

The spherical mirror 12 or other retro-reflective device has an effective radius of curvature equal to the distance between mirror 12 and the reimaging lens 49 and, therefore, mirror 12 plays the role of a condensing lens by refocusing light back through the aperture of lens 49. In the optical system just in front of spherical mirror 12 is a chopper disk 50 driven by a motor 51 which may, if desired, be the same motor as motor 33. As seen in FIG. 13, chopper disk 50 has adjacent its periphery an array of equally spaced parallel sided slits such as slit 52. Disk 50 is driven at a much higher speed than the speed of rotation of cylindrical lens 9.

In the absence of cylindrical lens 9, the light reimaged by mirror 12 forms an erect unity-magnification image in exact registration with the fingerprint or other pattern represented by the arrow or image 11*a* on card 1. Part of the scattered reimaged light is collected by lens 53 and is focused along an off-set optical axis 54 to generate a spatially filtered image represented by arrow 4 at the image surface of light detector array 20. With the cylindrical lens 9 rotating in the path of the reimaging optical system, the cylindrical lens 9 smears or blurs the pattern 4 in a single but continuously rotating direction. without lens 9, the bright spaces between the fingerprint or other pattern would be reimaged back on bright areas of the image 11*a* and dark or inked areas would be reimaged in exact registration with dark or inked areas thereof. Under these circumstances, the absorption or reimaged light on the opaque card 1 is minimized and the resulting scattered light is maximized. The single dimensional diffusing effect of the rotating cylindrical lens 9 causes some light from the bright areas of the card to be reimaged so that it falls on dark or inked areas of the card. Thus, the usual effect of smearing of the light image in one dimension is effective, decreasing the amount of light from the reimaged light beam scattered off of the card.

In those regions where the dark ridge lines of the fingerprint or other pattern lie along the direction of smearing by cylindrical lens 9, the bright areas remain substantially reimaged in registration with the bright areas of the card and inked or dark areas remain imaged on inked or dark areas on the card 1. The scattered signal from card 1 approaches that achieved when cylindrical lens 9 is absent. Therefore, as in embodiments of the invention utilizing a transparency instead of an opaque card, the ridge oreintation of any small area of the fingerprint pattern is determined again by measuring the angular azimuth location of cylindrical lens 9 at the instant of receipt of extremum or maximum light power by a corresponding photocell or other light detector of the array 20.

The purpose of the chopper disk 50 is to modulate the reimaged light pattern 11a so that light scattered after passage through the optical system can be distinguished from light that is simply scattered directly off of card 1. The separation of the desired modulated signal from the undesired background signal is simply accomplished by an ordinary alternating voltage coupling capacitor 67 or by a resonant circuit tuned to the frequency of chopper 50. The desired result may also be achieved by separating the undesired directly scattered light from the reimaged scattered light by inserting an optical converter device along axis 13 between lens 49 and card 1. The converter device has the added advantage of providing image intensification and is used for converting the wave length of the light directly scattered from light source 48 by card 1 to a non-overlapping wave length range. In this instance, the optical detector array 20 would be faced with an optical filter passing only the desired wave length or elements of the array 20 would otherwise be made sensitive only to that desired wave length.

It is seen that, according to the principles of the present invention, embodiments have been discussed for measuring fingerprint ridge orientation at plural sampling areas representative of a total fingerprint pattern. Two general measurement techniques have been presented, both making advantageous use of the novel concept of forming a replica optical image pattern precisely superimposed upon an original fingerprint pattern. One technique relies upon spatial modulation of a light beam with a fingerprint pattern; the other technique utilizes scattered light. According to a further embodiment of the invention, a fingerprint or line array pattern recognition device is provided for use where the fingerprint imprint is in the form of a colorless grease impression on a transparent substrate such as glass or plastic tape. Light transmitted on one pass through transparent parts of the pattern and then scattered by the grease impression on a succeeding pass is employed in the recognition process. The embodiment beneficially makes use of the fact that transparent grease fingerprints scatter light preferentially in a forward direction generally close to the direction of flow of the unscattered light rays.

While the natural oils of the human skin may provide a sufficient pattern on the glass or plastic substrate, it is preferred to make the imprint in a very thin uniform film of a grease deliberately applied to the substrate before the impression is made. Ordinary transparent grease-like materials such as petroleum jelly serve the purpose, as these have forward light-scattering properties somewhat approximately those of a specular mirror, most of the forward scattered energy falling within $\pm 10°$ of the perpendicular to the mirror.

Figures 14, 15:
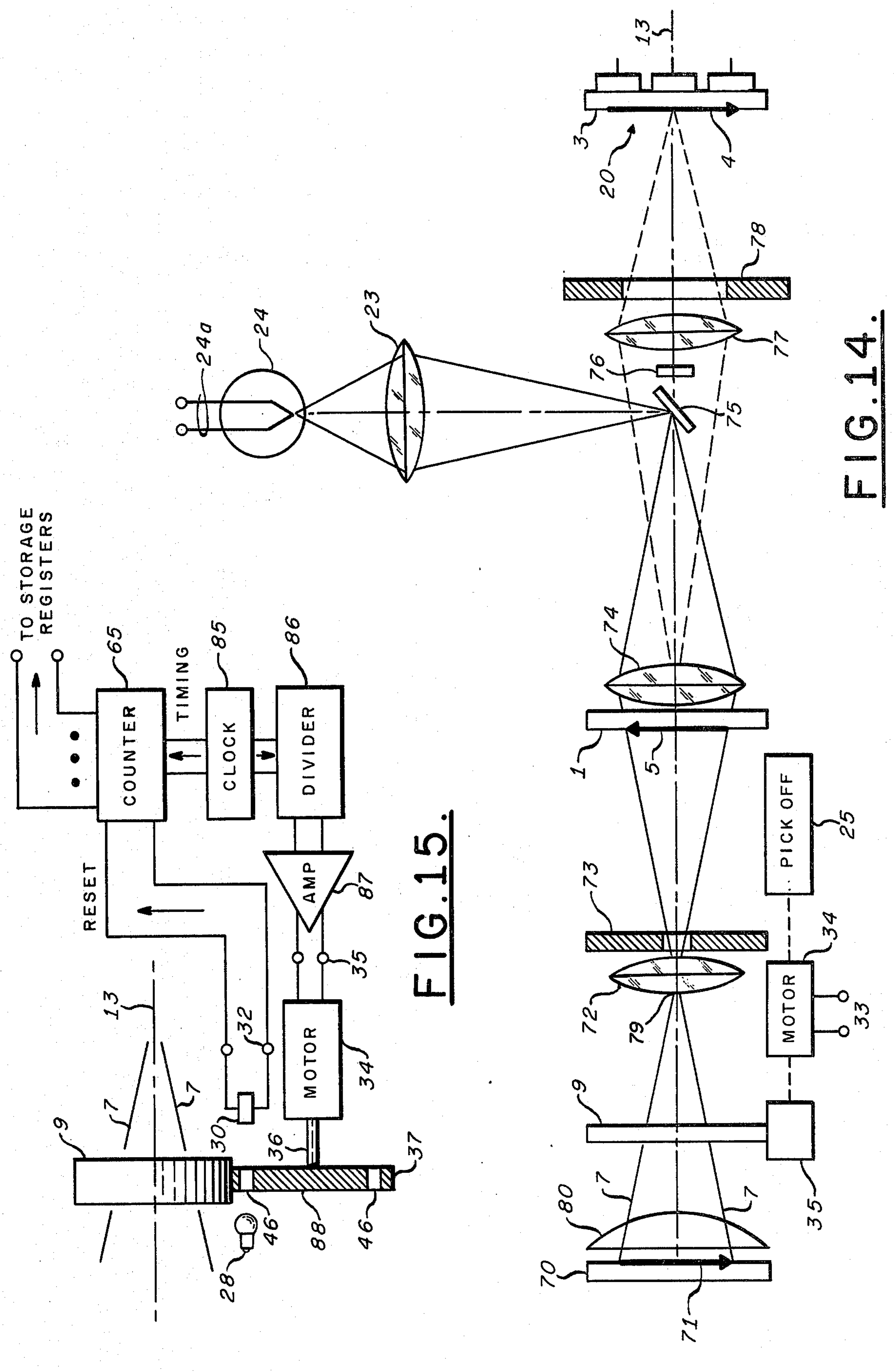
FIG. 14 is an optical schematic showing of a preferred alternative to the apparatus of FIG. 4.
FIG. 15 is a schematic drawing of a signal processing circuit which may be used with the apparatus of FIGS. 4, 12, or 14, for example.

FIG. 14 presents the further embodiment of the invention. Non-coherent light from the substantially point light source 24 is refocussed by condensing lens 23 on the reflecting surface of a small fully reflecting mirror 75 tilted to redirect the light along the principal optical axis 13 of the apparatus. The light diverging from mirror 75 is reconverged by condensing lens 74 and is brought to a focus at the plane of a small aperture defined by iris stop 73. The grease impression transparency 1 is placed directly adjacent lens 74 opposite mirror 75.

Any light transmitted through the grease impression transparency 1 is unscattered and is able to pass through the aperture of iris stop 73. On the other hand, most of the light scattered by the imprint of the face of transparency 1 is blocked by iris stop 73 and is thus removed from the optical system. The high quality imaging lens 72 placed adjacent stop 73 opposite transparency 1 substantially at the focal point 79 of the rays from lens 74 serves to place an image of the transparent parts of imprint 5 on a plane mirror 70. The locations of lens 72 and iris stop 73 relative to other optical system components and near the focal point 79 permits the area of lens 72 actually used for focussing to be minimal, thus minimizing any aberration effects of lens 72.

A condensing lens 80 is placed in the optical path with its planar surface adjacent the reflecting surface of mirror 70. The focal length of condensing lens 80 is selected so as to refocus light going through the aperture of iris stop 73 on its first pass for travel back through the same aperture on its second pass after reflection by mirror 70. Those skilled in the art will recognize that the light energy reflected by mirror 70 in the absence of the rotatable cylindrical lens 9, traces a path in the reverse direction in which the rays are superimposed on the rays of light originally reaching mirror 70. Because lens 72 produces an inverted image 71 of the transparency pattern on mirror 70, the light reflected by mirror 70 again produces an erect, unity-magnification image of the fingerprint pattern which, still in the absence of the rotatable cylindrical lens 9, is precisely superimposed on the grease pattern in exact registration.

The rotatable cylindrical lens 9 again serves to smear the reimaged light in one direction. However, in the present embodiment of the invention, it is elected not to collect the light that is transmitted by the grease transparency pattern 5 in the second passage therethrough of that light. Instead, this transmitted light component is blocked by the tilted fully-silvered small mirror 75 whose function of removing the transmitted light component may be augmented by the circular stop 76, if desired. The other component of the light, that scattered by the fingerprint grease pattern 5, is collected for measurement purposes as will be explained.

As previously noted, the major part of this scattered light energy travels closely to the direction of the unscattered retransmitted light and thereby falls upon lens 77, which lens 77 forms the desired spatially filtered image 4 of the fingerprint pattern on the image plane 3 coincident with a light detector array 20 such as that discussed with respect to the preceding embodiments. The apertured iris 78 is used to limit the light captured by lens 77 substantially only to the desired light scattered from the grease imprint 5, eliminating stray light such as any light reflected from the various optical elements of the system. The effects of such reflected light may also be minimized in the generally conventional way, as by placing a polarizer in front of non-coherent light source 24, an orthogonal analyzer at apertured iris 78, and a quarter wave plate at mirror 70.

It will be seen that no light can reach the detector array 20 unless the grease fingerprint-bearing transparency 1 is placed in position. Likewise, a minimal light level will reach detector array 20 in the absence of rotatable cylindrical lens 9 because the light transmitted by the grease imprint 5 on the first pass will strike transparent areas of the grease imprint on the second pass and will remain substantially unscattered in the second pass and therefore is removed from the optical system by the tilted mirror 75 and stop 76.

In operation with the rotatable cylindrical lens 9 inserted in the reimaging optical path between mirror 70 and lens 72, light transmitted through the transparent parts of the grease film imprint 5 will, in general, be smeared and will strike grease loaded positions of the film image 5 on transparency 1 on the second or return light passage. Only on those areas of the transparency 1 where the fingerprint ridge or other lines lie parallel to the defocusing direction of cylindrical lens 9 will light transmitted on the first passage be again transmitted on the second passage. Thus, the light rays scattered by the fingerprint image or impression are used in an optical system which produces a minimum light intensity signal over a given small portion of the fingerprint grease pattern when the azimuth angular orientation of cylindrical lens 9 has a well defined relation to the azimuth angular orientation of the fingerprint ridges of that small area. For all other orientations of the image-smearing cylindrical lens 9, a larger light signal power is yielded. Accordingly, the ridge orientation of a particular sampled portion of the fingerprint impression is now directly determined by measuring the orientation of the cylindrical lens 9 at the instant of minimum scattererd light power reaching the one of the detectors of detector array 20 responding to the corresponding part of the fingerprint impression pattern. Accordingly, it is seen that in the several embodiments of the foregoing discussion, the sampled fingerprint orientation is measured in terms of the orientation of the cylindrical lens 9 at the instant of an extremum value of the scattered light power reaching a predetermined one of the detectors of detector array 20, which extremum value may be either a maximum or a minimum light energy level.

Figure 9:
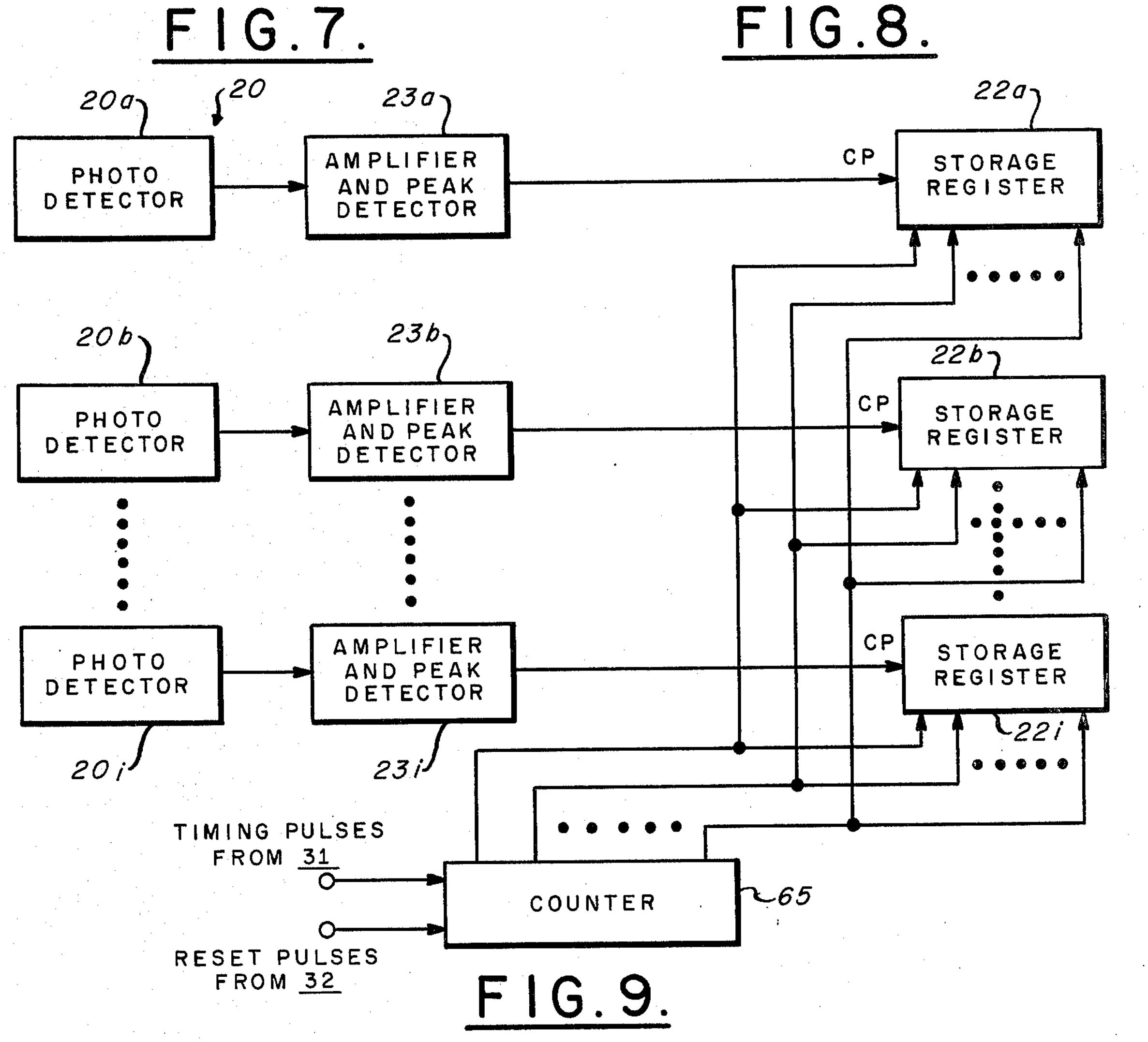
FIG. 9 is a schematic illustration of digital processing equipment which may be used in combinations with optical input devices constructed according to the present invention.

It is seen in FIGS. 4, 7, 8, and 9, for example, that the signal processing system of FIG. 9 is synchronized with respect to the rotation of cylindrical lens 9. In particular, the motor 34 driving lens 9 produces an output from the optical pick off system 25 for synchronous operation of the signal processing system. It will be apparent to those skilled in the art that other techniques for bringing about synchronous operation of the system may be used, such as that of FIG. 15. In FIG. 15, clock 85 not only directly supplies timing pulses to a counter such as counter 65 of FIG. 9, but also supplies power through frequency divider 86 and driver amplifier 87 to the terminals 35 of synchronous motor 34. Motor 34 has on its shaft 36 an optical pick off 88 provided with a driving drum surface or gear 37 for driving cylindrical lens 9 in one-to-one speed relation. Pick off 88 is equipped only with apertures or transparent sectors 46 corresponding to the transparent apertures 46 of the pick off 25 of FIG. 8, apertures 45 being absent. A corresponding lamp 28 and photocell 30 are supplied to generate reset pulses for operation of counter 65 as in FIG. 9. Accordingly, by the alternative arrangement of FIG. 15, the signal processing circuit of FIG. 9 is again synchronized with respect to the rotation of cylindrical lens 9.

Although the invention has been described with reference to digital processing, it will be appreciated that analog processing may also be employed. In this instance, the reference or vertical axis signal could be used to initiate generation of a saw tooth voltage which would be terminated and repetitively initiated for every 180 degrees of rotation of the spatial filter comprising cylindrical lens 9. As in the case of the digital processing, a single saw tooth generator could be time shared among the detectors with a single sample area being inspected during each half revolution of the spatial scanner, or the saw tooth generator could be used simultaneously in conjunction with all of the photodetector circuits to enable inspection of all sample areas in a half of a revolution of the scanner.

In the system discussed in connection with FIGS. 4 through 9, it is seen that rotation of the cylindrical lens or other stigmatic element 9 provides scanning of the field of fingerprint ridges as well as performing the primary function of identifying the direction of the fingerprint ridges. The alternative system of FIG. 14 may be operated in this general manner or it may be employed with an independent scanning system such as that of FIG. 15. With the apparatus of FIG. 16, scanning of the entire detector array takes place in a very small fraction of the time required for one revolution of the cylindrical lens 9. As in the previously discussed arrangements, the grease fingerprint transparency is placed in stationary relation with respect to the optical axis 13 of a system such as that of FIG. 14. When used with the scanning system of FIG. 16, the transparency remains stationary relative to the optical axis 13.

Figure 16:
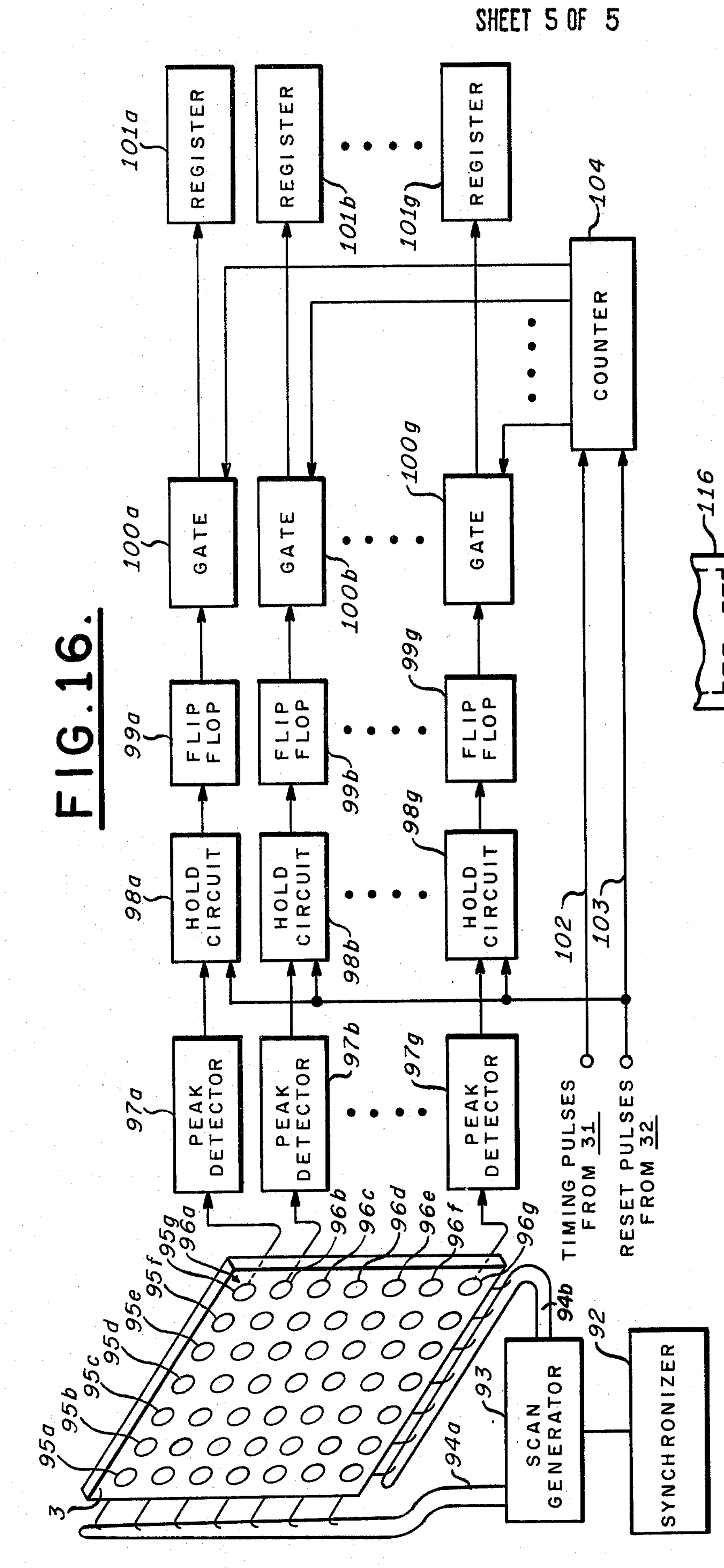
FIG. 16 is a wiring diagram of digital processing equipment alternative to that of FIG. 9.

In FIG. 16, scanning of the fingerprint pattern is accomplished by a square array of light detectors placed at the image plane 3 so as to form columns 95*a* through 95*g* and rows 96*a* through 96*g* of discrete detector elements. While a 7 by 7 array of light detectors is illustrated in the figure, an array available on the market having 32 rows and columns of light detectors arranged in a square matrix is also suitable, such an array being constructed of a plurality of charge coupled silicon light detectors.

FIG. 16 shows a circuit capable of providing a measure of the fingerprint ridge orientations over each of the plurality of parts of the image corresponding to the locations of one or another of the light detectors forming the square array. As noted previously, the cylindrical lens 9 is rotated very slowly compared to the rate of scanning of the detector array. Scanning of the detector array is provided in response to synchronizer 92 by the vertical and horizontal scan signal generator 93, the two scanning outputs of generator 93 being applied by multi-conductor cables 94*a* and 94*b* to a conventional switching matrix (not shown) for sequentially exciting the individual detectors. Because of the rapid scanning rate, individual columns such as column 95*a* are rapidly scanned in a vertical sense, horizontal scanning at a lower rate being provided by the successive vertical scanning of the detectors in each successive column 95*a* through 95*g*. Accordingly, in one mode of operation, the scanning system sequentially accesses the plurality of detector elements of the matrix in turn while lens 9 has remained essentially stationary.

For purposes of discussion, assume that the scanning generator 93 sequentially accesses a column of detectors such as column 95*g* during such a very short time period. Those detectors 96*a* through 96*g* in column 95*g* which are illuminated in the time era being considered, because of a particular relation between the fingerprint ridge directions and cylindrical lens 9, provide an output to an associated peak detector in the array of peak detectors 97*a* through 97*g*. These peak detectors may include amplifier stages, if desired, and may convert the input signals as suggested in FIGS. 10 and 11. The output of each excited peak detector is supplied to a corresponding voltage level holding circuit of the array 98*a* through 98*g* of holding circuits. If any one or more of the level holding circuits has its held voltage raised when it is accessed, a corresponding flip-flop of the array 99*a* through 99*g* of flip-flops is set to a logical one. On the other hand, if the signal level output of any one of the holding circuits decreases, the corresponding flip-flop of the array 99*a* through 99*g* is set to a logical zero.

As in the apparatus of FIG. 9, the cylindrical lens 9 rotates constantly and automatically provides timing pulses via lead 102 from a pick off such as pick off 31 shown in FIG. 4 for timing the operation of a digital counter 104 corresponding generally to counter 65 of FIG. 9. Thus, as lens 9 rotates, the count in counter 104 is synchronized with the position of lens 109. As in the apparatus in FIG. 9, counter 104 of FIG. 16 is automatically reset to zero after each full 180° rotation of lens 109. For this purpose, an appropriate reset voltage is supplied via lead 103 to counter 104. The timing pulses and the reset pulse may be cooperatively generated as shown in FIG. 4 by pick offs 29 and 30.

The function of the circuit array 99*a* through 99*g* of flip-flops is to control individual gate circuits of an array 100*a* through 100*g* of gating circuits which are connected to control gated signals which pass from the successive stages of counter 104 to individual ones of the array 101*a* through 101*g* of digital registers. In this manner, the angle count transferred to the individual storage registers 101*a* through 101*g* is updated or remains undisturbed depending on whether or not the corresponding light detector in the light detector column 95*g* receives a higher intensity light signal than already recorded by the corresponding register during the same 180° rotational period of cylindrical lens 9. At the end of each such 180° rotation of lens 9, each storage register 101*a* through 101*g* contains a digital representation of the angular location corresponding to the peak light signal for its corresponding light detector. At this instant, the peak holding circuits 98*a* through 98*g* are reset to an arbitrary voltage level such as zero in preparation for the detection of finger print ridge angles detected by the next column of light detectors, such as column 95*a*, for example. The apparatus operates in the same general manner, shifting successively to scan the several successive detector columns of the detector array. When all of the plurality of light detectors have been accessed, the total fingerprint pattern is stored in the array of registers 101*a* through 101*g* and the stored data may be observed in a conventional manner with conventional displays associated with the individual registers or may be removed and transformed in a conventional manner for processing in an ordinarily digital processing system.

It will be apparent to those skilled in the art that conventional elements may be employed in the arrangement of FIG. 16. For example, the peak detector 97*a*, the voltage holding circuit 98*a*, the flip-flop 99*a*, the gate circuit 100*a*, the register 101*a*, and each of their counterparts may be provided by conventional circuits well known in the art. Similarly, counter 104 is a conventional circuit responsive to timing and reset pulses in the conventional manner. Similarly, the scanning voltage synchronizer 92 and scan generator 93 are the conventional types of circuits normally used with switching matrices and multiple light detector arrays currently on the market.

Figure 17:
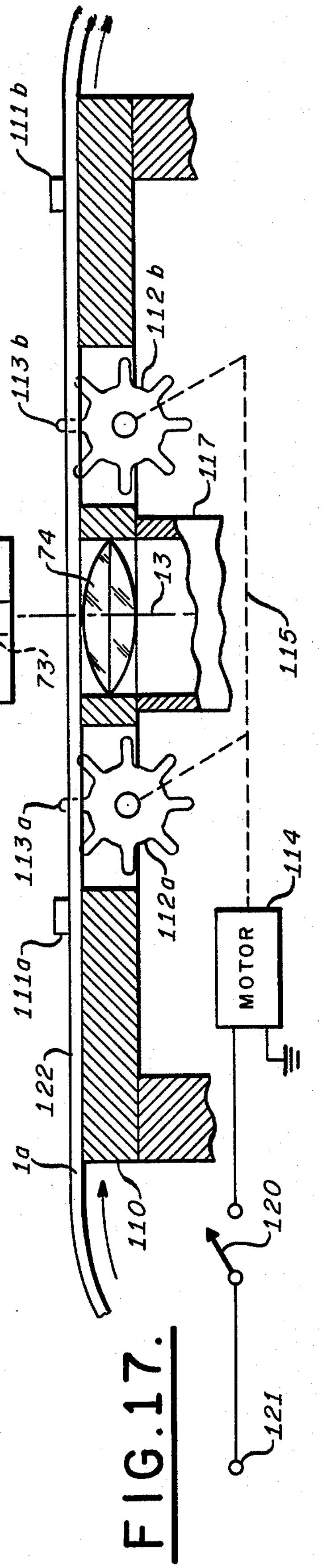
FIG. 17 is an elevation view partly in cross section of transparent web handling apparatus for use with the processing equipment of FIG. 16.

The system of FIG. 16 may be modified in a simple manner for use with the arrangement of FIG. 17. The objective of the apparatus of FIG. 17 is to provide in a mechanical manner the equivalent of the relatively slow scan from column to column accomplished in the system of FIG. 16 through the use of the scanning voltage applied by cable 94*b*. In the system of FIG. 17, the transparency 1*a* in the form of a continuous web is moved at a steady rate corresponding to the aforementioned slow rate of electronic scan of the detector array, through the field of view of an optical system such as that of FIG. 14. That optical system is suggested, for example, in FIG. 17 by the upper housing 116 which supports the iris 73 and the elements to the left thereof in FIG. 14. Furthermore, the lower housing 117 is provided to support lens 74 and the elements at the right thereof in FIG. 14. In FIG. 17, the transparent medium 1*a* corresponds to transparency 1 in FIG. 14, being placed proximate lens 74.

When switch 120 of FIG. 17 is open, motor 114 is not operative; therefore, shaft 115 and sprocket wheels 112*a* and 112*b* remain stationary. In this situation, it is seen that the transparency 1*a* is placed over a horizontal platform 110 where it may be held by suitable guides represented at 111*a* and 111*b* with edge sprocket holes in engagement with one or more sprocket teeth, such as sprocket teeth 113*a* and 113*b* of sprocket wheels 112*a* and 112*b*.

In this situation, an appropriate grease coating and a print to be inspected may be supplied in a position such as at the general location 122 on the surface of transparency 1*a*. When this is accomplished, switch 120 may be closed so that voltage from a power supply connected to terminal 121 activates motor 114, driving the sprocket wheels 112*a* and 112*b* and consequently the transparent web 1*a* toward the right in the figure at a substantially constant rate. In this manner, the image originally located at 122 passes through the optical axis 13 of the fingerprint identifying optical apparatus. This passage is at a constant rate and provides the same function as electronic scanning in one dimension of the fingerprint pattern. It will be apparent to those skilled in the art that electronic scanning in a mutually perpendicular direction may be afforded by using only one of the scanning systems illustrated in FIG. 16. Since the motion of the transparent web 1*a* serves both to provide one dimensional scanning and also to bring a clean area of web material into position for the application of the next fingerprint, the moveable tape configuration of FIG. 17 has apparent advantages with respect to ease of operation.

It will be recognized by those skilled in the art that the invention may be practiced using any of several known techniques, including the use of a cooperative assembly of known analog or digital data processing or computing circuits. Many examples of both analog and digital elements are available in the prior art for accomplishing the various individual required operations and it is well known that they may readily be coupled together in cooperative relation for attaining the desired results. It is furthermore evident that a conventional general purpose digital processor may be employed for the purpose. It is obviously well within the ordinary skill of digital computer programmers to process the data discussed above, the create flow charts, and to translate the latter into digital processor routines and subroutines for the desired processing along with a compatible computer language for processing input data and instructions to produce outputs directly useful for application as desired.

Accordingly, the invention includes preferred embodiments of apparatus for the rapid sampling of the orientation of fingerprint ridges by using a simple non-coherent light source and by the observation of variations in transmitted or scattered light. The print image in the form of an opaque photograph transparency or grease impression on a transparent substrate is used in an optical processing system reimaging the print image upon itself within a reflecting optical system of unity magnification. The ridge angle is measured by rotating an optical component such as a cylindrical lens or one-directional scattering device in the reimaging path, which component produces a one-directional smearing of the reimaged light. The light transmitted by each discrete sampled area of the fingerprint image varies in accordance with the instantaneous relation of ridge direction and the light smearing direction. Therefore, an array of optical detectors may be used to detect the variations in light signal level in terms of the light smearing direction. The time delay between a reference orientation of the light smearing element and the occurrence of a light peak or null at each individual detector of the matrix is measured and a corresponding analog or digital representation is generated. The latter may be stored for display or for transfer to a suitable digital processor. Accordingly, the object of the invention is met in providing an improved fingerprint inspection apparatus which is comparatively simple and inexpensive to manufacture, less sensitive to optical and manufacturing tolerances, less sensitive to fingerprint orientation and distortion, capable of high reliability, adaptable to use with digital computer processing apparatus, and does not require the use of a coherent light source.

While the invention has been described in its preferred embodiments, it is to be understood that the words which have been used are words of description rather than of limitation and that changes may be made within the purview of the appended claims without departing from the true scope and spirit of the invention in its broadest aspects.

What is claimed is:

1. An optical fingerprint pattern identification apparatus comprising:

means for optically illuminating a fingerprint pattern to be identified to produce an optical beam representative of said fingerprint pattern, first optical imaging lens means responsive to said optical beam, reflector means for returning said optical beam through said first optical imaging lens means for forming an erect, unity-magnified image of said fingerprint pattern susperimposed upon said fingerprint pattern, second optical imaging lens means responsive to light from said reflector means passing between the line components of said fingerprint to form a second image of said fingerprint pattern at an image plane, and selector means having a reference direction between said fingerprint pattern and said first optical imaging lens means for spatial modulation of said second image according to the direction of said fingerprint line components with respect to said reference direction.

2. Apparatus as described in claim 1 wherein said selector means comprises rotatable means for cyclic space modulation of said second image.

3. Apparatus as described in claim 1 wherein said selector means comprises stigmatic refractor lens means rotatable about an optical axis for cyclic modulation of said second image.

4. Apparatus as described in claim 3 wherein said stigmatic refractor lens means rotatable about an optical axis for cyclic space modulation of said second image comprises cylindrical lens means.

5. Apparatus as described in claim 2 wherein said means for optically illuminating said fingerprint pattern comprises non-coherent light source means for producing a noncoherent optical beam representative of said fingerprint pattern.

6. Apparatus as described in claim 2 wherein said means for optically illuminating said fingerprint pattern includes mirror means interposed in tilted relation between said fingerprint pattern, said second optical imaging lens means, and said non-coherent light source means for directing light through said fingerprint pattern.

7. Apparatus as described in claim 2 wherein said fingerprint pattern is supported upon a surface of transparent substrate means for producing in cooperation with said means for optically illuminating said fingerprint pattern said beam representative of said fingerprint pattern.

8. Apparatus as described in claim 2 wherein said transparent substrate means comprises flexible transparent web means adapted for movement across an optical axis of said identification apparatus.

9. Apparatus as described in claim 8 additionally including motive means for selectively driving said web means with respect to said means for optically illuminating said fingerprint pattern and said optical imaging lens means.

10. Apparatus as described in claim 2 additionally including optical detector means as said image plane.

11. Apparatus as described in claim 10 wherein said optical detector means comprises plural discrete light sensor means for generating plural discrete output signals representing said cyclic space modulation of said second image.

12. Apparatus as described in claim 11 wherein each said discrete light sensor means is positioned at said image plane at a discrete location corresponding to a finite sample area of said fingerprint pattern for determining the corresponding direction of said fingerprint line components within each said finite sample.

13. Apparatus as described in claim 12 including means for determining the time interval between a predetermined time reference and the instant of the extremum value of the light intensity at each discrete light sensor means.

14. Apparatus as described in claim 13 wherein the time interval determining means includes means for generating a signal representative of each time interval, further comprising means for storing the respective time interval representative signals.

15. Apparatus as described in claim 13 wherein said time interval determining means includes:
- counter means,
- reset means for resetting said counter means at a predetermined scanning position of said selector means,
- means for generating timing pulses for application to said counter means for providing a timing count therein representative of said time interval, and
- register means for storing said timing count corresponding to the time interval between the instant of reset and the instant of extremum light intensity at each said discrete light sensor means.

16. Apparatus as described in claim 13 wherein said selector means is rotatable about an optical axis at a substantially uniform angular rate for controlling transmission of said fingerprint pattern to the said respective discrete light sensor means in successive instants of time during a half revolution of said selector means.

17. Apparatus as described in claim 6 wherein said mirror means comprises partially reflecting, partially transmitting mirror means for directing light through said fingerprint pattern.

18. Apparatus as described in claim 6 wherein said mirror means comprises reflecting mirror means blocking only a central portion of said second imaging lens means.

19. Apparatus as described in claim 18 further including condenser lens means proximate said fingerprint pattern for forming an image representative of said fingerprint pattern upon means for reflecting said image back through said condenser lens means for forming said erect, unity-magnified image of said fingerprint pattern superimposed on said fingerprint pattern.

20. Apparatus as described in claim 19 wherein said reflecting mirror means is placed at the focal point of said condenser lens means.

21. Apparatus as described in claim 13 wherein said time interval determining means includes:
- counter means,
- motor means for driving said selector means,
- reset means responsive to said motor means for resetting said counter means,
- clock means for driving said motor means and supplying timing pulses to said counter means for providing a timing count therein representative of said time interval, and
- means for storing said timing count corresponding to the time intervals between the instant of reset and the instant of extremum light intensity at each said discrete light sensor means.

22. Apparatus as described in claim 10 wherein said optical detector means comprises:
- plural discrete light sensor means at said image plane, and
- raster scanning means for successively accessing the total of said discrete light sensor means in a time small compared to the time of one half revolution of said rotatable means.

* * * * *